2,789,074
Patented Apr. 16, 1957

2,789,074

FLUXES FOR DIP BRAZING ALUMINUM

Mike A. Miller, New Kensington, Pa., assignor to Aluminum Company of America, Pittsburgh, Pa., a corporation of Pennsylvania No Drawing. Application February 11, 1954, Serial No. 409,769

4 Claims. (Cl. 148—26)

This invention relates to fluxes for dip brazing aluminum. In particular the invention relates to new dip brazing fluxes of higher density than the fluxes heretofore known for dip brazing aluminum. The word "aluminum," as used herein, includes both aluminum of various grades and aluminum base alloys.

Dip brazing of aluminum is performed by immersing an aluminum structure, assembled for joining by brazing and having an aluminum brazing alloy adjacent the joint or joints to be made, in a molten flux bath. The brazing alloy may be present either in the form of a coating or a filler material integrally associated with one or more of the parts to be joined, or in the form of wire or shims held in place on the structure by a jig or clips. The molten flux bath is held at a temperature above its liquidus and the liquidus of the aluminum brazing alloy, and below the solidus of the structural parts being joined. The molten flux bath, therefore, serves as the medium for melting the brazing alloy and also as the fluxing agent.

Typical fluxes heretofore commercially used in the dip brazing of aluminum structures have a density of about 1.65 to 1.75 g./cc., whereas the molten brazing alloys commercially used have a density of about 2.45 to 2.50 g./cc. While these densities vary only slightly over the range of temperatures encountered in dip brazing, I have chosen to specify the densities as measured at 1180° F., which is in the upper range of conventional brazing temperatures.

In the dip brazing of aluminum structures, a variety of capillary environments are encountered. For example, in the brazing of an I section, the brazing alloy forming the upper fillets tends to run down the vertical web of the section, while that forming the lower fillets tends to run out along the horizontal flanges. Where the joints run both horizontally and vertically from a common bottom apex, the fillet formation in the vertical joint is reduced both because of the effect of gravity and the strong capillary attraction of the horizontal joints. It has been recognized, of course, that the rise of brazing alloy in a vertical capillary is assisted by the buoyancy of the flux bath. It is an object of this invention, however, to make more effective use of the buoyancy of the bath by providing fluxes for dip brazing aluminum which have substantially higher density than the fluxes heretofore known.

Fluxes for brazing aluminum must have suitable solvent and fluxing characteristics, a liquidus below the temperature at which they are to be used, and other properties not always found in compositions possessing particular desired properties. It is not, therefore, possible to add just any heavy material for the purpose of increasing flux density. It is a further object of this invention, then, to provide new fluxes for dip brazing aluminum which have suitable solvent and fluxing characteristics, and sufficiently low liquidus, as well as densities substantially higher than those of fluxes heretofore known. Other objects and advantages of the invention will appear hereinafter.

Typical commercial fluxes heretofore used contain aluminum fluoride and generally one or another of the alkali metal fluorides as active flux components. These fluxes also contain the three common alkali metal chlorides and, in one case, strontium chloride, the chlorides providing a suitable solvent or vehicle for the active fluoride components. It is also to be noted that the flux densities range only from about 1.65 to 1.75 g./cc. as measured at 1180° F.

I have discovered a new class of fluxes for dip brazing aluminum, having substantially higher densities. Their description is conveniently introduced by the following table showing examples as to composition and density of the new fluxes:

*Table 1.—New dip brazing fluxes composition by weight, density at 1180° F.*

|         | A    | B    | C    | D    | E    | F    | G    | H    |
|---------|------|------|------|------|------|------|------|------|
| AlF$_3$ | 7.2  | 6    | 7.2  | 5.5  | 7    | 5.5  | 5.5  | 7    |
| LiF     |      |      | 7.1  |      | 5    |      |      |      |
| BaF$_2$ | 11.9 | 15.5 | 4.8  | 12.5 | 7    | 7.5  | 7.5  | 7    |
| LiCl    | 19   | 9.5  | 19   | 8    | 30   | 14.5 | 14.5 | 18   |
| NaCl    | 28.6 | 37   | 28.6 | 36   |      | 5    | 6.5  |      |
| KCl     | 33.3 | 32   |      | 2.5  |      |      |      |      |
| BaCl$_2$|      |      |      |      |      | 38   | 38   | 40   |
| NaBr    |      |      |      |      |      | 1.5  |      |      |
| KBr     |      |      | 33.3 | 30.5 | 56   | 28   | 28   | 28   |
| Density | 1.96 | 1.97 | 2.03 | 2.07 | 2.13 | 2.51 | 2.51 | 2.52 |

The liquidus of each of the fluxes in the above table is below 1060° F.

The new fluxes which I have discovered may be generally described with reference to composition, density and melting point. They comprise, by weight, between 10 and 30% of active fluoride components and between 70 and 90% of non-fluoride vehicle components. They should consist essentially of these components alone, as they are hereinafter described, but may contain small amounts of other components not incompatible with the density or melting point desired or the service to which they are to be put.

The active fluoride components essential to the new fluxes consist of between 4 and 8% of aluminum fluoride and between 4 and 26% of at least one of the alkali metal and alkaline earth fluorides. Of the latter fluorides, the one which is essential to the new fluxes is barium fluoride in an amount between 4 and 20%. I have found that barium fluoride is an unexpectedly effective, active fluoride component, when employed in a substantial amount within the range just specified. Furthermore, it serves the purpose of introducing a heavier-than-usual fluoride component, thus increasing the flux density. As in the case of the older commercial fluxes, any of the other alkali metal or alkaline earth fluorides may also be present, but there is no particular advantage in having them present when the object is one of increasing the flux density, although lithium fluoride is the most useful of these other fluorides for controlling the melting point or adjusting the flux activity.

The non-fluoride vehicle components essential to the new fluxes consist of at least three of the alkali metal and alkaline earth halides, preferably at least two chlorides and potassium bromide. Of these halides, one which is essential to the new fluxes is lithium chloride in an amount between 5 and 40%. The use of at least three of these halides is desirable in order to control density and melting point, and I have found that lithium chloride is essential in the range stated for the purpose of lowering the liquidus to a suitable value.

Fluxes made up in accordance with the description just given may be readily checked for liquidus and density when molten. They will generally have a liquidus below 1060° F. and a density as measured at 1180° F. of at least 1.95 g./cc.

It will be noted that the new compositions described above, resulting in flux densities of at least 1.95 g./cc., are characterized by having a density at least 10% higher than the density of typical commercial fluxes heretofore known. Such an increase in density may be employed to produce much more than a 10% increase in cross sectional area of vertical fillets formed when these fluxes are used for dip brazing, and more than a 10% decrease in difference in cross sectional area of top and bottom horizontal fillets.

A particular vehicle component which is preferably included in the fluxes made up in accordance with the invention is potassium bromide in an amount between 20 and 60%. By including this component, flux densities of at least 2.0 g./cc. are readily obtained. As indicated by Table 1, sodium bromide, for example, may also be included, but its use is not particularly desirable since greater increases in flux densities may be obtained with potassium bromide.

A chloride vehicle component which is preferably included in the fluxes described is barium chloride in an amount between 20 and 60%. When both barium chloride and potassium bromide are included within the ranges stated, fluxes are readily produced having densities of at least 2.4 g./cc.

Almost complete equalization of top and bottom horizontal fillets, or greatly extended heights of substantially uniform vertical fillets, may be obtained if the flux density is approximately 2.5 g./cc. I have found that a flux of such a density and having a suitable melting point below 1060° F. will be produced invariably if the flux composition consists essentially of, by weight, approximately 5 to 8% aluminum fluoride, 6 to 10% barium fluoride, 13 to 20% lithium chloride, 36 to 42% barium chloride, and 25 to 35% potassium bromide. Both fluxes G and H in Table 1 are such fluxes.

Drainage from vertical capillaries, which would produce vertical fillets of varying cross-section, may be avoided when using fluxes of the type described herein, if the aluminum structure being joined in the dip brazing bath is moved to a portion of the bath at a temperature below the solidus of the brazing alloy, or if the entire bath itself is cooled to such a temperature, prior to removal of the structure from the flux bath. In order to permit doing this, it is of course essential that the liquidus of the flux bath be lower than the solidus of the brazing alloy. This condition is generally obtainable if the liquidus of the flux is below 1060° F., since the solidus of most brazing alloys is at 1075° F. or higher.

I claim:

1. A flux for dip brazing aluminum consisting essentially of, by weight, between 10 and 30% active fluoride components and between 70 and 90% non-fluoride vehicle components, said fluoride components consisting of between 4 and 8% aluminum fluoride and at least one of the alkali metal and alkaline earth fluorides, one of which is barium fluoride in an amount between 4 and 20%, and said non-fluoride components consisting of alkali metal and alkaline earth halides, of which at least three are employed, one of which is lithium chloride in an amount between 5 and 40%, said flux having a density as measured at 1180° F. of at least 1.95 g./cc. and having a liquidus below 1060° F.

2. A flux for dip brazing aluminum consisting essentially of, by weight, between 10 and 30% active fluoride components and between 70 and 90% non-fluoride vehicle components, said fluoride components consisting of between 4 and 8% aluminum fluoride and at least one of the alkali metal and alkaline earth fluorides, one of which is barium fluoride in an amount between 4 and 20%, and said non-fluoride components consisting of alkali metal and alkaline earth halides, of which at least three are employed, one of which is lithium chloride in an amount between 5 and 40%, and one of which is potassium bromide in an amount between 20 and 60%, said flux having a density as measured at 1180° F. of at least 2.0 g./cc. and having a liquidus below 1060° F.

3. A flux for dip brazing aluminum consisting essentially of, by weight, between 10 and 30% active fluoride components and between 70 and 90% non-fluoride vehicle components, said fluoride components consisting of between 4 and 8% aluminum fluoride and at least one of the alkali metal and alkaline earth fluorides, one of which is barium fluoride in an amount between 4 and 20%, and said non-fluoride components consisting of alkali metal and alkaline earth halides, one of which is lithium chloride in an amount between 5 and 40%, one of which is barium chloride in an amount between 20 and 60%, and one of which is potassium bromide in an amount between 20 and 60%, said flux having a density as measured at 1180° F. of at least 2.4 g./cc. and having a liquidus below 1060° F.

4. A flux for dip brazing aluminum consisting essentially of, by weight, approximately 5 to 8% aluminum fluoride, 6 to 10% barium fluoride, 13 to 20% lithium chloride, 36 to 42% barium chloride, and 25 to 35% potassium bromide, said flux having a density as measured at 1180° F. of approximately 2.5 g./cc. and having a liquidus below 1060° F.

References Cited in the file of this patent

UNITED STATES PATENTS

| 1,923,375 | Holt | Aug. 22, 1933 |
| 2,497,538 | Emley et al. | Feb. 14, 1950 |
| 2,507,346 | Miller | May 9, 1950 |

FOREIGN PATENTS

| 489,568 | Canada | Jan. 13, 1953 |